Figure 1:
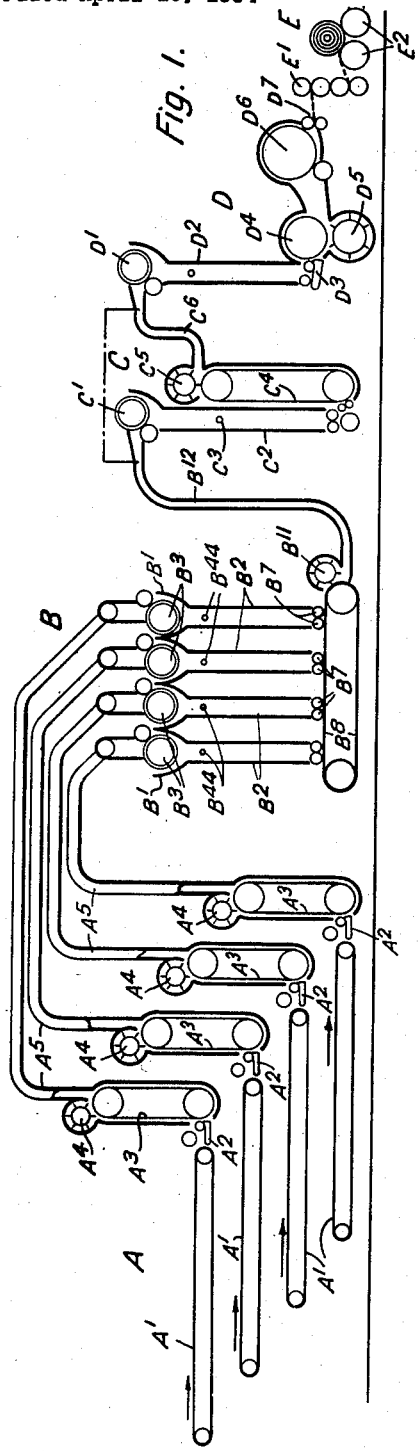

July 15, 1958 — W. A. HUNTER ET AL — 2,842,803
PREPARATION OF BLENDED FIBROUS MATERIALS
Filed April 15, 1954 — 5 Sheets-Sheet 1

Inventors
William Aldred Hunter
and Frank Singleton
By Moses, Nolte, Craver & Berry
Attorneys July 15, 1958   W. A. HUNTER ET AL   2,842,803
PREPARATION OF BLENDED FIBROUS MATERIALS
Filed April 15, 1954   5 Sheets-Sheet 4

July 15, 1958  W. A. HUNTER ET AL  2,842,803
PREPARATION OF BLENDED FIBROUS MATERIALS
Filed April 15, 1954  5 Sheets—Sheet 5

United States Patent Office 2,842,803
Patented July 15, 1958

2,842,803

PREPARATION OF BLENDED FIBROUS MATERIALS

William Aldred Hunter, Stanhill, Accrington, and Frank Singleton, Accrington, England, assignors to T. M. M. (Research) Limited, Oldham, Lancashire, England Application April 15, 1954, Serial No. 423,388

6 Claims. (Cl. 19—146)

This application is a continuation-in-part of our application Serial No. 338,973, filed February 26, 1953, and entitled "Preparation of Blended Fibrous Materials," which has now been abandoned. The objects of the invention, generally speaking, are the provision of improved apparatus for preparing for processing, e. g. spinning, a blended mixture of two or more different fibrous materials (which term is employed herein to denote fibres of different kinds, grades, qualities, colours or other characteristics), such apparatus being suitable for continuous operation upon ingredients taken directly from the bale; and it may include all steps necessary to be carried out before the carding stage.

Our present invention covers improvements upon the invention described in our application No. 302,914 filed August 6, 1952, now U. S. Patent No. 2,816,327, for "Improvements Relating to the Blending of Textile Fibrous Materials." The said application covers an apparatus and process in which different fibrous ingredients are blended with a high degree of intimacy of admixture, this involving the feeding of a plurality of ingredient materials to separate reception and delivery units; the material in each unit is fed therefrom upon a conveyor which receives the material from each unit in turn in finely divided form, so that the different ingredient materials are superposed one upon another. This material is stripped from the conveyor and may be subjected to further operations.

The invention covered by the present application relates to apparatus and process of the character just referred to in which various improvements thereupon are povided. Particularly, a plurality of opening devices are provided, which may be equal in number to the different ingredients which will be blended in the most common practice. The various ingredients may and commonly will be opened separately thereby and will then be conveyed to the appropriate reception and delivery units. These units will commonly be equal in number to the opening devices, and, if desired the different ingredient materials, separately opened, will be conveyed to different units, one ingredient material to each unit.

Such an arrangement will be adequate for the great majority of cases which arise in practice; a different distribution of the ingredient materials may however occasionally be called for. For example, with a plant having four openers and four reception units, it may be desired to change from a four colour or other ingredient blend, to one of two colours or other ingredients, so that only two of the four openers may be required. In such a case, according to the present invention, provision is made for distributing the output of the two openers as desired, for example, one ingredient to go to the first and third reception units and the other ingredient to the second and fourth, which would be likely to give a better blend than would be obtained by cutting two reception units out of operation when two openers were cut out, so that each opener would feed only one unit.

Other variations of the means of distribution of the opened material than that just referred to may be desirable in different cases so that, for example, two or more openers will feed a single reception unit, or the like; and it may sometimes be desirable to arrange that one opener is to open more than one ingredient, as when, with a plant having four openers and four reception units, it is desired to change from a four material blend to one of five or more materials. Accordingly, provision is made in the present invention for the conveyance of opened material from selected members of the plurality of opening devices to selected members of the same or a greater number of reception and delivery units, as desired.

In accordance with one embodiment of apparatus comprised in our invention, means are provided for subjecting each ingredient of the blend separately to an opening operation; for conveying each such opened ingredient separately to one of the reception and discharge units referred to, specifically, a gravity feed trunk, reserved for said ingredient, in quantities or at a rate such as to maintain a constant head of material therein; for discharging the ingredient from each trunk at a metered rate to a continuously travelling conveyor common to all said trunks, the material being transferred to the conveyor under conditions in which the conveyor receives successively a substantially uniform dispersion of tufts of each ingredient; and removing the resultant blend of ingredients from said conveyor.

The opened mass of blended fibres stripped from the conveyor is preferably formed into a lap suitable for treatment in the carding engine. The invention includes the optional interpolation of one or more supplementary opening stages after the material leaves the conveyor, in which case the material is preferably transported from the conveyor to said additional opening stage or stages at a rate proportional to the rate of throughput thereat.

Apparatus comprised in the invention also includes a plurality of devices for opening the material, a plurality of reception units such as the feed trunks referred to, means for conveying the opened material from selected members of the plurality of opening devices to selected members of the plurality of feed trunks, as desired, and means for discharging the contents of said trunks and superposing the same one upon another, means being provided for distributing the output of the openers among or to some or all of the feed trunks, as is required or desirable under different conditions of operation.

Figure 6:
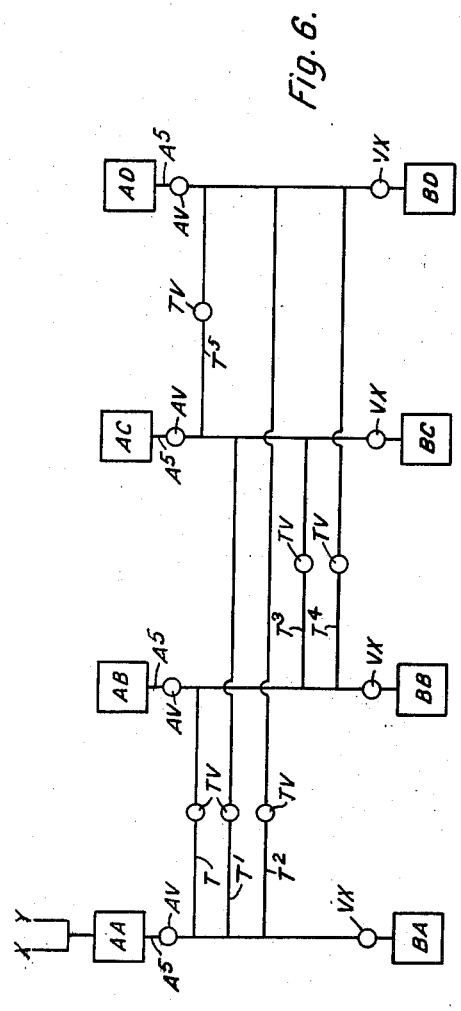
Figure 2:
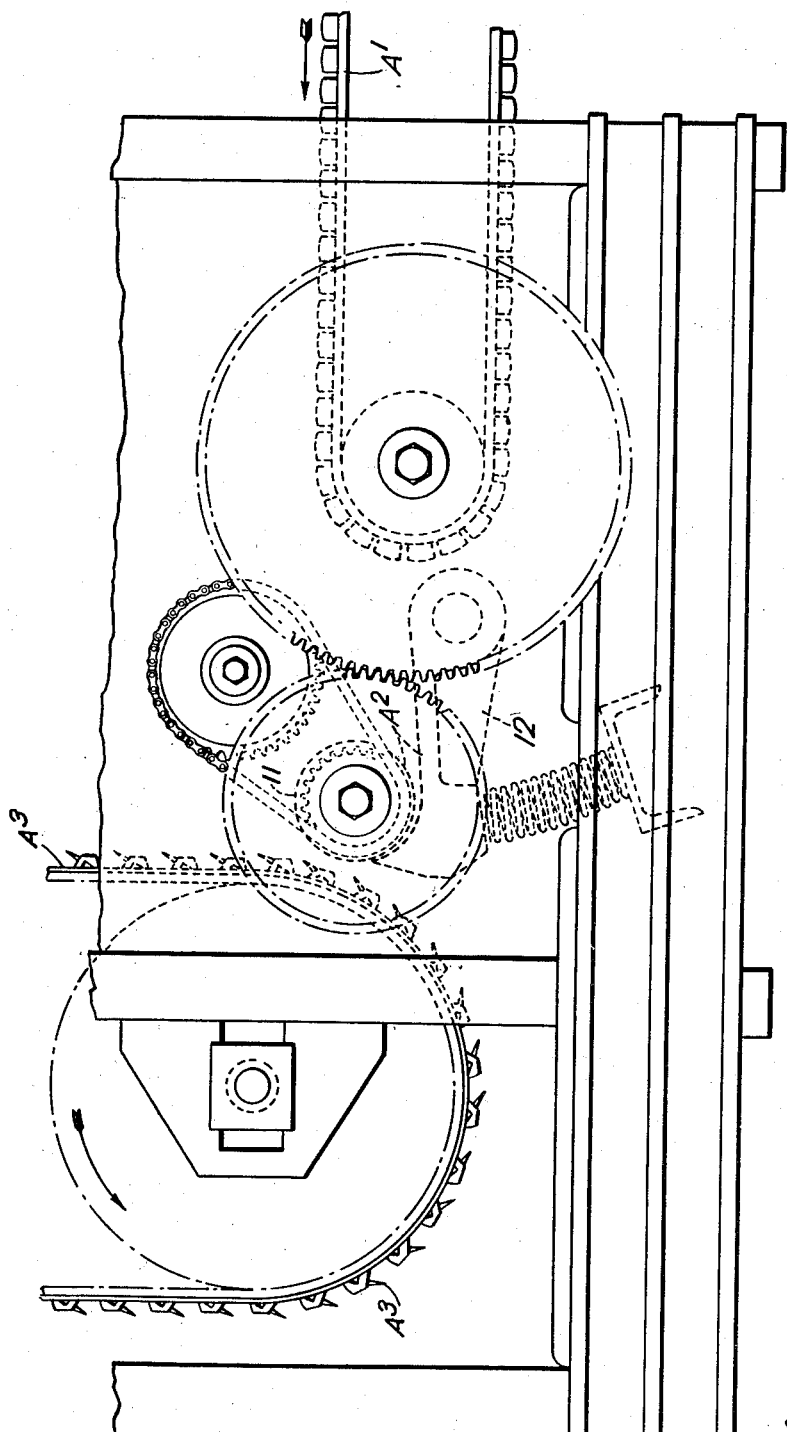

A plant embodying one form of the invention is illustrated diagrammatically in the accompanying drawing and is hereinafter described in greater detail with reference thereto. In said drawings Fig. 1 is a longitudinal elevation of the plant and Figs. 2, 3, 4 and 5 are partly sectional elevations drawn to an enlarged scale respectively illustrating the preliminary opening apparatus, the blending apparatus, the secondary opening apparatus and the final intensive opening apparatus, which are incorporated in the plant illustrated in Fig. 1. Fig. 6 is a diagram illustrating the several alternative means of operating the apparatus according to the particular blend required.

The plant shown in Fig. 1 includes a preliminary opening apparatus A, the blending apparatus B, a secondary opening apparatus C, a final intensive opening apparatus D, and a lap-forming unit E.

The opening operation which constitutes the introductory stage of the process is preferably performed in respect of each individual ingredient of the blend upon the machine A (Fig. 2) comprising a travelling horizontal feed lattice $A^1$ upon which the fibrous material is deposited in the form of a layer of substantially even thickness, a roller-and-pedal feed mechanism $A^2$ which is adapted to receive the fleece from said lattice $A^1$ and to present it at a controlled rate in a slightly compacted condition to the teeth of a spiked lattice $A^3$ by which the fibres are subjected to a combing operation (Fig. 2) whilst held between said roller and pedals at $A^2$ and conveyed forward as released therefrom. The roller-and-pedal mechanism referred to is of course a well known device comprising the pedal 12, spring-pressed towards the roller 11, and against the fleece which passes between the roller and pedal.

The spiked lattice $A_3$ is cleared at its delivery point by a suitable pneumatic or other conventional stripping apparatus $A^4$, and the fibrous material, now thoroughly opened by the aforesaid combing operation, is transported by a pneumatic delivery duct $A^5$ to the blending station.

It will be understood that the machine designated generally by the reference letter A, and incorporating the components $A^1$ to $A^5$, is multiplied in parallel (as shown in Fig. 1) according to the number of different ingredients which it is proposed to include in a given blend. It is desirable that the opening action performed at A upon each ingredient shall be regulated, by adjusting the relative speeds of the roller and pedal feed mechanism $A^2$ and the spiked lattice $A^3$, in such manner that all the ingredients are presented at the next stage of the process in substantially the same degree of openness.

Figure 3:
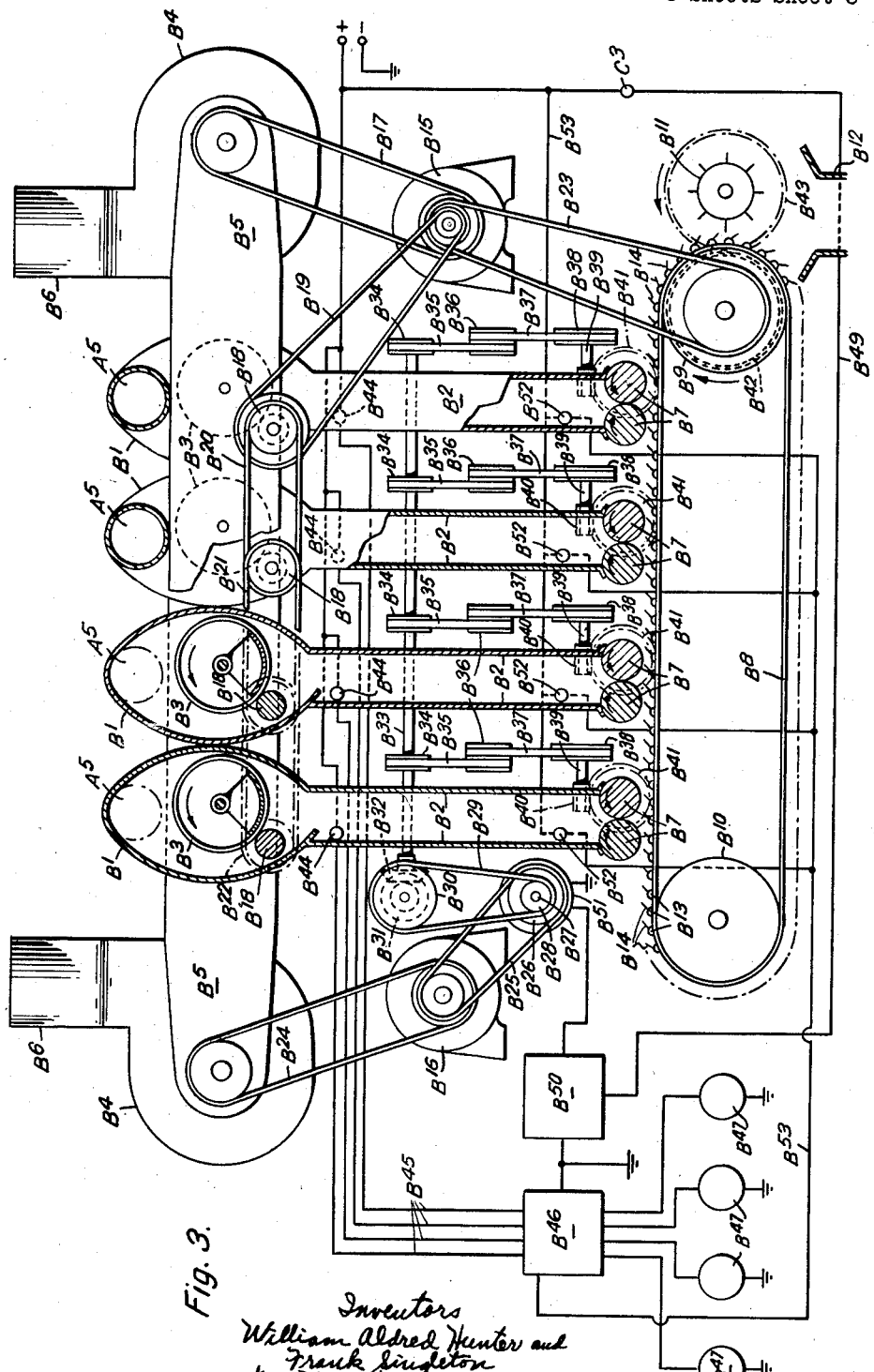
Figure 4:
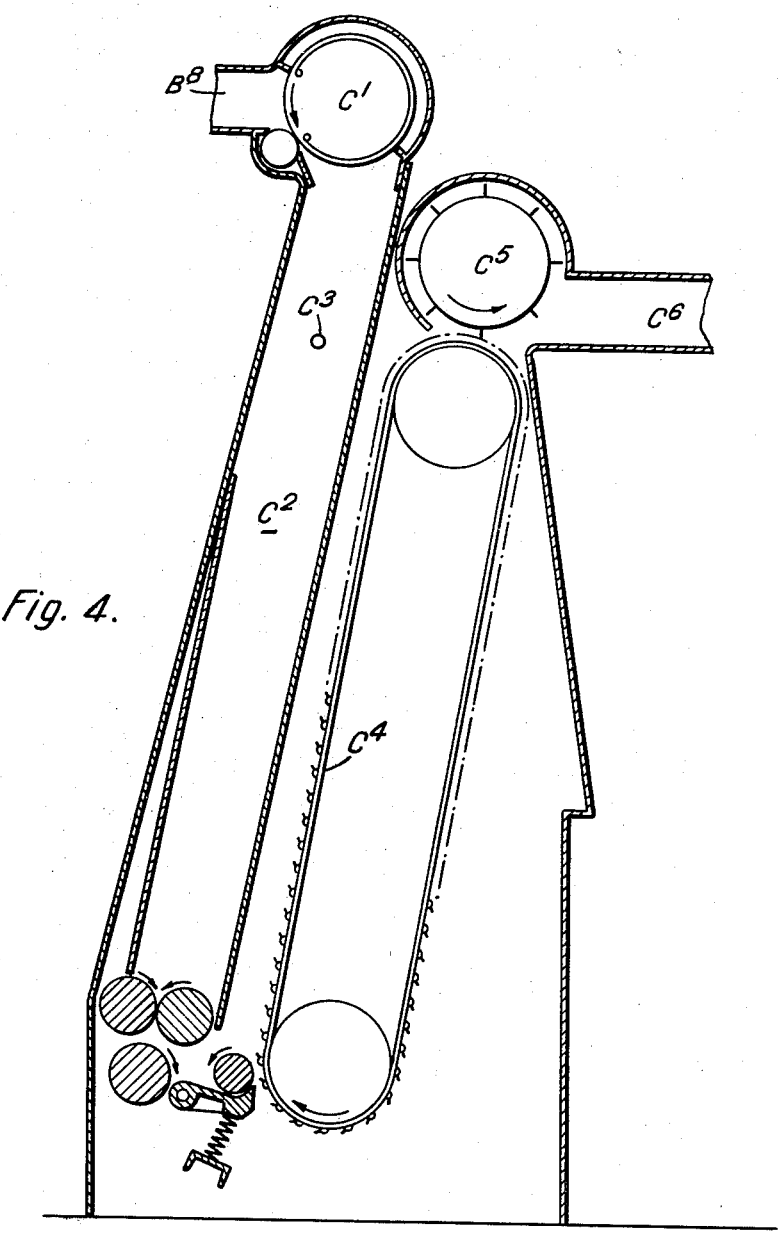
Figure 5:
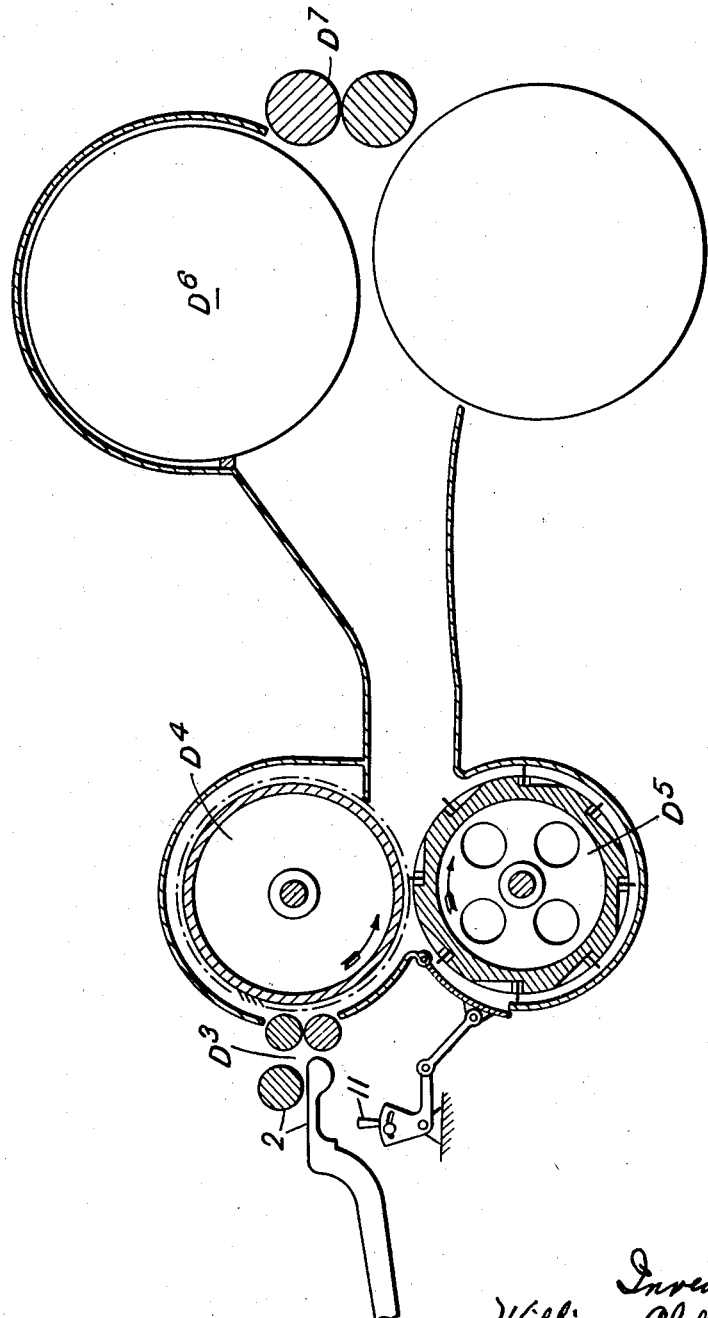

The blending apparatus includes an individual reception unit in respect of each of the parallel deliveries of different ingredients, and it may advantageously take the form of the apparatus shown in Fig. 3, which comprises an assembly of measured-rate delivery units each of which includes a vertical gravity-feed trunk $B^2$ at the head of which is a rotary damped condenser cage $B^3$. Said cage $B^3$ is enclosed in a casing $B^1$ which is entered by one of the pneumatic feed ducts $A^5$ at the delivery end thereof, and all the cages $B^3$ are aspirated by means of fans $B^4$, $B^4$ to which connection is made with said cages by manifolds $B^5$, $B^5$, and the outlets of which are seen at $B^6$, $B^6$.

The otherwise open aperture at the base of each gravity feed trunk $B^2$ is controlled by a pair of metering rollers $B^7$, $B^7$, which are arranged to rotate in contrary directions so as to discharge the contents of the trunk at a rate governed by the speed of rotation of the rollers.

The several trunks $B^2$ are assembled with their respective discharge points side-by-side in alignment, so that their respective metering rollers $B^7$ are contained in a common horizontal plane and located at equally spaced intervals, above the upper horizontal course of a high-speed lattice conveyor $B^8$, which is trained over driving rollers $B^9$, $B^{10}$, and with which there is associated a stripper element $B^{11}$, by which material conveyed on the lattice is removed and directed into the pneumatic trunk $B^{12}$ hereinafter referred to. Said lattice $B^8$ bears closely-spaced cross-members $B^{13}$ which are furnished with rows of spikes $B^{14}$ inclined in the direction of travel of the lattice. Said spikes $B^{14}$ may be disposed over the lattice surface in a uniformly staggered formation so as to avoid an unduly marked tracking effect. Furthermore, said spikes are set with their tips so close to the metering rollers $B^7$ that by the impalement by the former of the fringe of material which projects between said rollers (as will be understood from the following description), said spikes are individually charged with tufts of fibres collected in turn from the fringe at the metered discharge point of each trunk $B^2$.

The several moving parts of the apparatus are driven from two electric motors $B^{15}$, $B^{16}$. The shaft of the motor $B^{15}$ is geared to one of the fans $B^4$ by the belt $B^{17}$, to the condenser cage driving rollers $B^{18}$, $B^{18}$ by the belts $B^{19}$, $B^{20}$, $B^{21}$ and $B^{22}$, and to the roller $B^9$ of the conveyor lattice $B^8$ by the belt $B^{23}$. The shaft of the motor $B^{16}$ drives the other of the fans $B^4$ by the belt $B^{24}$ and to one of each of the pairs of metering rollers $B^7$, $B^7$ through the belt $B^{25}$, a pulley $B^{26}$, a shaft $B^{27}$, a pulley $B^{28}$, a belt $B^{29}$, a pulley $B^{30}$, bevel gears $B^{31}$, $B^{32}$, a shaft $B^{33}$ and individual belt-drives each of which includes a pulley $B^{34}$, a belt $B^{35}$, a variable-speed gear $B^{36}$, a belt $B^{37}$, a pulley $B^{38}$, a shaft $B^{39}$, and worm and worm-wheel gears $B^{40}$, $B^{41}$. The stripper $B^{11}$ is conveniently geared to the roller $B^9$ by spur-gearing $B^{42}$, $B^{43}$.

The delivery rate of the metering rollers $B^7$, $B^7$, may be regulated separately at each unit by suitable adjustment of the variable-speed device $B^{36}$.

The ingredient fibre received from the relative duct $A^5$ by each cage $B^3$ is condensed thereon and caused to be deposited within the trunk $B^2$, where a substantially constant head is maintained by a photo-electric detector cell $B^{44}$ which is sensitive to the instantaneous quantity of material in the trunk and which is connected by the line $B^{45}$ to suitable electronic apparatus $B^{46}$ serving to control a speed regulator (indicated conventionally at $B^{47}$) associated with the lattice $A^1$ of the primary opening stage A, the arrangement being such that the rate of output at stage A is adjusted in accordance with the rate at which the fibre in the trunk $B^2$ is being discharged by the metering rollers $B^7$. It will be understood that suitable light sources (not shown) are positioned in alignment with cells $B^{44}$ to illuminate the same when the passage of the light is not obstructed by material in the trunks containing these cells, at the level thereof, so that none of such cells will be energised so long as the column of material in its trunk stands at a level above such cell.

Each trunk $B^2$ also preferably contains a photo-electric detector cell $B^{52}$, all of the same being suitably connected by a line $B^{53}$ to the electronic control apparatus $B^{46}$, the cells $B^{52}$ being near the bottoms of the trunks $B^2$. It will be understood that suitable sources of illumination (not shown) are arranged to illuminate cells $B^{52}$ when the material in the trunks containing the same drops below the level of such cells. When, therefore, any trunk is nearly emptied of material, the level thereof having dropped below the cell $B^{52}$ in such trunk, the energisation of such cell will transmit a signal to the electronic control apparatus $B^{46}$. The latter has two functions. One is to control the speed regulator $B^{47}$, whereby the speed of the motor operating the feed lattice $A^1$ which feeds opened material to a particular feed trunk $B^2$ is increased whenever the photo-electric cell $B^{44}$, is illuminated, because of the fact that material in that trunk has dropped below the level of that cell, as noted above. The other function of control apparatus $B^{46}$ is to stop the entire blending apparatus whenever the level of material in any trunk falls below the level of the cell $B^{52}$ thereof, so that a signal is sent from that cell to the control apparatus $B^{46}$, as stated above. This function is accomplished by the apparatus shown diagrammatically at $B^{46}$ by a suitable conventional arrangement whereby the motors $B^{15}$ and $B^{16}$ of the blending apparatus and the motors for all the feed lattices $A^1$ are stopped or uncoupled whenever a signal as described is sent by a cell $B^{52}$ to the control device $B^{46}$.

As has already been explained, the ingredient of each trunk $B^2$ is discharged by the rollers $B^7$ (at a rate determined by the setting of the variable speed device $B^{36}$) so that it emerges in the form of a downwardly-depending sheet the fringe whereof is continuously combed by the tips of the spikes $B^{14}$ of the lattice $B^8$. The tufts of fibre which are impaled upon the lattice spikes $B^{14}$ at each successive pair of metering rollers $B^7$ compose a tenuous layer, so that when the spikes reach the stripping point at the conveyor roller $B^9$ the lattice is carrying as many superposed layers of different ingredients as there are delivery units in the blending apparatus.

The composite mass of layered tufts is removed from the lattice by the stripper $B^{11}$ and discharged into the duct $B^{12}$, whence the blended material in the particular apparatus illustrated is conducted to the opening machine C.

The opening machine C (Fig. 4) comprises a cage condenser $C^1$ and a gravity feed trunk $C^2$, which are respectively similar to the components $B^3$ and $B^2$ of the blending apparatus, and a photo-electric cell $C^3$ in said trunk $C^2$ which is connected by a line $B^{49}$ (Fig. 3) to electronic apparatus $B^{50}$ serving to control a clutch $B^{51}$ which is included in the shaft $B^{27}$ between the pulleys $B^{26}$ and $B^{28}$ in the drive of the metering rollers $B^7$, $B^7$ of the feed trunks $B^2$, the arrangement being such that in the event of the photo-cell $C^3$ being operated when the level of the material received in the trunk $C^2$ reaches the height thereof, delivery from the blending apparatus to the opener is arrested by the stoppage of the metering rollers $B^7$, $B^7$.

The adjustment of the variable-speed units $B^{36}$, by which it is possible to effect a variation in the gear-ratio between the pulleys $B^{34}$ and $B^{38}$ in the metering roller drives, enables the rate of delivery of each ingredient to the blending lattice $B^8$ to be determined as may be necessary to provide any desired proportional admixture in the blend of materials discharged into the trunk $B^{12}$. The several metered deliverey units $B^2$ may be calibrated for use with specific kinds of fibre, so that irrespective of its density the required proportion of an ingredient in a given blend may be achieved merely by regulating the speed of the metering rollers $B^7$, $B^7$ of the trunk $B^2$ in question, by an adjustment of the relative unit $B^{36}$.

The output from the opener C is delivered by a spiked lattice $C^4$ having a stripper $C^5$ which discharges into a pneumatic duct $C^6$.

The final opening stage in the apparatus illustrated is performed by an intensive opening machine D (Fig. 5) which comprises a cage condenser $D^1$ which receives the blended fibres from the duct $C^6$ a gravity feed trunk $D^2$, a roller-and-pedal feed mechanism $D^3$, a beater $D^4$, a stripping cylinder $D^5$, a cage condenser $D^6$ and a pair of delivery rollers $D^7$. (The intensive opening machine D may be replaced by a conventional scutcher, the lattice of which is fed from the trunk $D^2$, conveniently by means of a single delivery roller, from which the material is delivered to the lap-forming rollers $E^1$, $E^2$.)

From the stage D, the fleece issuing from the rollers $D^7$ is passed through the stack of calendar rollers $E^1$ of the lap-forming machine (Fig. 1) to be converted into a compactly wound lap by the rollers $E^2$ upon which the lap rests and by which it is rotated.

If desired, and more particularly in the treatment of synthetic staple fibre which does not require the same degree of opening as natural fibres, the supplementary opening stage by the machine C may be omitted, in which case the pneumatic duct $B^{12}$ (Fig. 1) is arranged to deliver directly into the inlet of the final opening stage D.

Due to the fact that the blending operation is performed at an early stage in the process, and to the care which is taken to ensure that the several ingredients are individually opened before blending, it is possible by the process hereinbefore described to attain an unusually homogeneous dispersion of each ingredient throughout the mixture, so that their individual characteristics are substantially incapable of detection and a yarn of fabric possessing a very high degree of uniformity can be obtained.

The blending apparatus B may be modified in the manner illustrated diagrammatically in Fig. 6, for the purpose of enabling it to operate with different distributions of opened material in different cases when required or desired, as has been indicated above. In this figure, the gravity feed trunks of a four trunk blending apparatus, which may be similar in all respects to the trunks $B^2$, shown in Fig. 3, are indicated respectively at BA, BB, BC and BD, which are connected by ducts $A^5$, to the primary opening machines AA, AB, AC and AD respectively, the opening machines and connecting ducts being the same as those shown in Fig. 1. Said ducts $A^5$ are also inter-connected by transfer ducts, of which the duct T, as shown, connects the first two ducts $A^5$, the duct $T^1$ connects the first and third, the duct $T^2$ connects the first and the fourth, while the duct $T^3$ connects the second and the third, the duct $T^4$ connects the second duct $A^5$ with the fourth duct $A^5$ and the duct $T^5$ connects the third with the fourth duct $A^5$. The ducts $A^5$ are controlled by valves AV and each transfer duct is controlled by a valve TV.

The apparatus thus modified may be used to distribute opened material from any selected members of the opening devices, including all of them, to any selected members of the group of feed trunks, including all of them. For example, all of the valves AV being open and all of the valves TV being closed, each opener AA, AB, AC and AD delivers respectively to a separate trunk BA, BB, BC and BD of the blending apparatus, an arrangement which may be used for blending four different ingredients, opened separately, as already described.

For another example, by suitably setting the valves, AV and TV, a single opener may be connected to feed two or more delivery trunks and similarly two openers, for example, may be connected to feed more than two trunks. This may be useful, for instance, where a mill has installed a blending line embodying four openers and blending apparatus having four gravity feed trunks, and wishes to change from a four-ingredient to a two-ingredient blend. In such a case, it may be desirable to have two openers deliver to all four trunks, which should give a somewhat better blend than merely having two openers co-operating with two feed trunks. Accordingly, openers AA and AB being used to open the two ingredients respectively, the valves AV of the openers AA and AB will be open and the valves AV of the openers AC and AD closed, valves TV in ducts T and $T^2$ will be closed, leaving valve TV in duct $T^1$ open, so that opener AA will deliver to trunks BA and BC, and valves TV in ducts $T^3$ and $T^5$ will be closed leaving valve TV in duct $T^4$ open, so that opener AB will deliver to trunks BB and BD.

In another arrangement, by suitably setting the necessary valves, the delivery from any two openers can be fed to one trunk of the blending apparatus. Such an arrangement may be desirable where there is a fairly large proportion of one of the ingredient materials, particularly if this material is unusually difficult to open. In such a case, it might be advantageous to distribute this material between two or more openers, delivering to a single trunk. Thus, the material referred to could be supplied to two openers, AA and AB, both delivering to trunk BB, all valves AV being open, valve TV in duct T being open, and valves TV in ducts $T^1$, $T^2$, $T^3$, $T^4$ and $T^5$ being closed. In this case, valve AV in the duct $A^5$ leading from opener AA, being open, it is necessary to provide means for preventing material from opener AA being received by trunk BA, as well as by trunk BB. We have therefore indicated further valves VX, in the end portions of the four ducts $A^5$ adjacent to the trunks BA, BB, BC and BD. If, therefore, the valve VX, adjacent to trunk BA is closed, and the other three valves VX, left open, openers AA and AB will both deliver to trunk BB, while opener AC delivers to trunk BC, and opener AD to trunk BD. Similarly, the delivery from any two openers can be distributed between any three blending trunks.

Another case to be covered is one in which, on occasion, more ingredient materials are to be blended than the number of openers provided in the plant. For example, with an opening and blending apparatus built to provide for a blending of no more than four materials, it may be desired to change to a blend of five or more ingredients. In such a case, it may be advantageous to weigh out the correct proportions of, say, two of the ingredients, and to deposit them in layers, one on top of the other, on a feed lattice of the lattice opener, for example, on the feed lattice $A^1$ of the opener AA, Fig. 6. If then, each of the openers is connected to deliver only to its own particular blending trunk (opener AA to trunk BA, opener AB to trunk BB, etc.) the result will be that trunk BA, for example, contains two different ingredients, while each of the other trunks contains one ingredient only. This arrangement is indicated in the diagram Fig. 6, where one ingredient feed to opener AA is indicated at X and the other at Y.

Similarly, it may occasionally be desirable, for reasons of economy or otherwise, to add a very small proportion of some different material to one or more, for example, or to all of the main ingredients of the blend, which can readily be done by admixture of the added and main ingredients on the feed lattices. The general practice, however, is to reserve each individual opener for a separate ingredient.

The above illustrations are given by way of example only, and it will be understood that the numbers of openers and blending trunks may be modified to suit other particular requirements.

What we claim as our invention and desire to secure by Letters Patent is:

1. In apparatus for preparing for processing textile fibrous material comprising a plurality of ingredients, the combination of a plurality of mechanisms for opening the material, a plurality of feed trunks, each said mechanism comprising the following, viz. an endless feed lattice adapted to receive a layer of fibrous material, means for progressing the same, an endless spiked lattice with means for progressing the same, and a roller and pedal feed mechanism positioned to receive the material from said first lattice and to present it at a controlled rate to the spikes of said spiked lattice, means for delivering the opened material from said spiked lattices to said feed trunks, means for discharging the contents of each trunk in sheet formation, means for controlling the rate of such discharge from each trunk, a conveyor, means for progressing the same past the discharge points of said trunks successively, means carried by said conveyor for detaching material in finely divided form from the emergent fringe of ingredient from each trunk, in turn, and receiving the same superposed upon each other upon said conveyor, means for removing such material from said conveyor at a point beyond the discharge point of the last of said trunks, further fibre opening means, and means for delivering thereto the material removed from said conveyor.

2. Apparatus adapted to prepare for processing textile fibrous material including a plurality of ingredients which apparatus comprises a plurality of devices for opening the respective ingredients separately to substantially the same degree of openness, said devices including means for controlling the feed to the same, each such device including combing means, and means for progressively feeding the ingredient material thereto whereby to effect an opening of the constituents thereof, a plurality of reception units having discharge openings, means for conveying the open ingredient materials of certain of said devices to certain members of said plurality of reception units, means for continuously compressing the contents of each reception unit into sheet formation therein and for advancing the same edge foremost at measured rate through the said opening of said reception unit, a conveyor, means for progressing the conveyor past the discharge opening of said reception units successively, means carried by said conveyor for positively detaching material in finely divided form from the advancing edge of the material from each reception unit, in turn, and for retaining the same superimposed upon said conveyor and means for removing said material from said conveyor at a point beyond the discharge point of the last of said reception units.

3. Apparatus adapted to prepare for processing textile fibrous material including a plurality of ingredients as in claim 2, wherein the combing means in each device includes means to restrain the ingredient material, and spiked means effective to comb the leading edge of the ingredient material so restrained.

4. Apparatus adapted to prepare for processing textile fibrous material including a plurality of ingredients as in claim 2 including connections between the several means for conveying the opened ingredient materials and the several reception units and means for altering said connection in such manner that the reception unit selected to receive the respective opened ingredients may be changed to permit the distribution of said ingredients to be modified as desired.

5. Apparatus adapted to prepare for processing textile fibrous material including a plurality of ingredients as in claim 4 including delivery ducts connecting the several opening devices with the respective reception units, a transfer duct between each pair of delivery ducts, and valves in said delivery ducts and transfer ducts.

6. Apparatus adapted to prepare for processing textile fibrous materials including a plurality of ingredients, which apparatus comprises a plurality of devices for opening the respective ingredients separately to substantially the same degree of openness, each such device including combing means, and means for progressively feeding the ingredient materials thereto whereby to effect an opening of the constituents thereof, a plurality of reception units having discharge openings, means for conveying the opened ingredient material from any one of said devices to any members of said plurality of reception units, means for continuously compressing the contents of each reception unit into sheet formation therein and for advancing the same edge foremost at measured rate through the said opening of said reception unit, a conveyor, means for progressing the conveyor past the discharge openings of said reception units successively, means carried by said conveyor for positively detaching material in finely divided form from the advancing edge of the material from each reception unit, in turn, and for retaining the same superimposed upon said conveyor, means at a point beyond the discharge point of the last of said reception units for removing the superimposed particles of the blended ingredients from said conveyor, and means for performing a further opening action on said blended ingredients.

References Cited in the file of this patent

UNITED STATES PATENTS

| Number | Name | Date |
|---|---|---|
| 67,226 | Tainter | July 30, 1867 |
| 308,185 | Martin | Nov. 18, 1884 |
| 812,311 | Tyden | Feb. 13, 1906 |
| 1,346,828 | Kido | July 20, 1920 |
| 1,359,029 | Butler | Nov. 16, 1920 |
| 2,057,641 | Curley | Oct. 13, 1936 |
| 2,412,506 | Greene et al. | Dec. 10, 1946 |
| 2,636,222 | Wilkie | Apr. 28, 1953 |
| 2,665,453 | Senior et al. | Jan. 12, 1954 |

FOREIGN PATENTS

| Number | Country | Date |
|---|---|---|
| 34,104 | Austria | Aug. 25, 1908 |